March 25, 1924.

L. L. GARIBALDI ET AL 1,488,150

STEAMING AND DRAINING KETTLE

Filed Feb. 15, 1922

Inventor
Lester L. Garibaldi
Francis M. Cary
By Harry C. Schroeder
Attorney

Patented Mar. 25, 1924.

1,488,150

UNITED STATES PATENT OFFICE.

LESTER L. GARIBALDI, OF HAYWARD, AND FRANCIS M. CARY, OF OAKLAND, CALIFORNIA.

STEAMING AND DRAINING KETTLE.

Application filed February 15, 1922. Serial No. 536,667.

*To all whom it may concern:*

Be it known that we, LESTER L. GARIBALDI and FRANCIS M. CARY, citizens of the United States, residing at Hayward and Oakland, respectively, in the county of Alameda and State of California, have invented certain new and useful Improvements in Steaming and Draining Kettles, of which the following is a specification.

Our invention is an improved steaming and draining kettle which is simple in construction, inexpensive and durable.

Referring to the annexed drawing in which our invention is illustrated and which forms a part of this specification:

Figure 1:
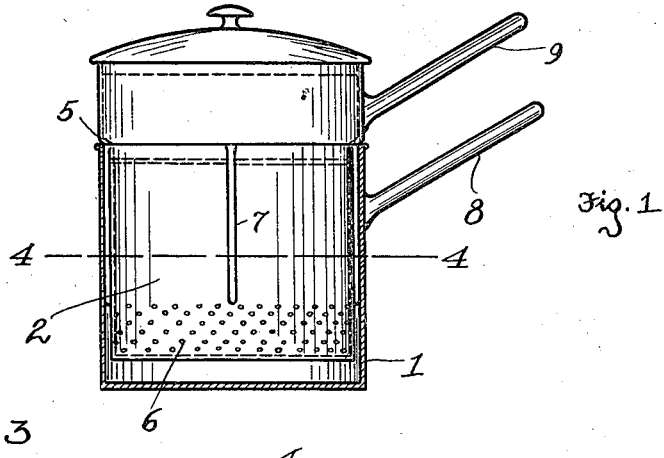
Figure 1 is a view partly in vertical section and partly in elevation of our kettle.
Figure 3:
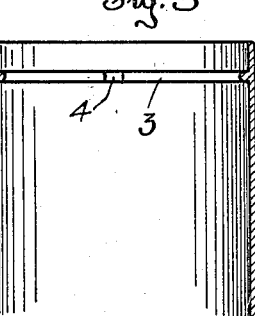
Figure 3 is a vertical section of the outer receptacle.
Figure 2:
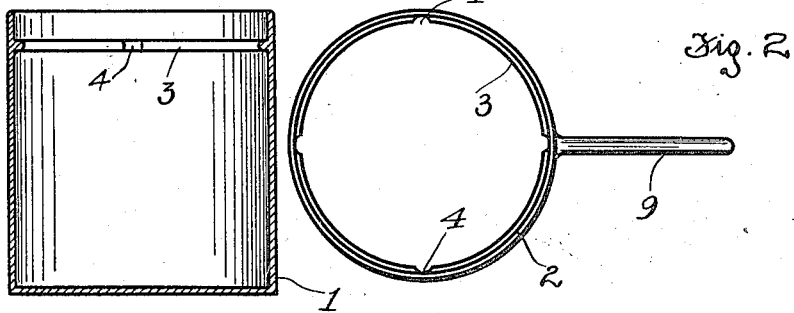
Figure 2 is a plan view of the outer receptacle.
Figure 4:
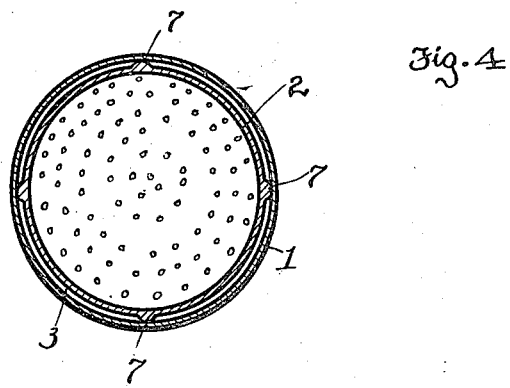
Figure 4 is a horizontal section of our kettle taken on line 4—4 of Figure 1.

Our kettle comprises an outer cylindrical receptacle 1 and an inner cylindrical receptacle 2. In the upper part of the outer receptacle is formed an internal annular flange 3 provided with four notches 4 equi-distant apart. The lower body portion of the inner receptacle 2 is slightly smaller in diameter than the upper part thereof so as to fit within the outer receptacle 1 inside the flange 3 and to provide an annular shoulder 5 between said lower body portion and upper part to rest upon the upper edge of the outer receptacle 1 to support the inner receptacle with the bottom thereof a short distance above the bottom of the outer receptacle. The bottom and lower portion of the inner receptacle 2 is provided with perforations 6. Vertical external ribs 7 are formed equi-distant apart on the inner receptacle 2, extending from the shoulder 5 to a point just above the uppermost perforations 6, said ribs resting in the notches 4 when the inner receptacle is in the outer receptacle. Handles 8 and 9 are secured on the outer and inner receptacles respectively. The vertical ribs 7 fitting closely into the notches 4 and the side walls of the outer container prevent the escape of steam when the contents are boiling, and also act as a means for retaining the upper vessel in elevated position when raised above the rib 3 and turned slightly so that the rib 7 rests on the rib 3.

The inner receptacle may be lifted until the lower ends of the ribs 7 are above the flange 3 and the receptacle may then be turned until the lower ends of said ribs rest upon said flange and support the receptacle in an elevated position in the outer receptacle and above the water in the outer receptacle so that the inner receptacle may be drained and its contents steamed.

Having described our invention, we claim:

A kettle of the character disclosed including an outer receptacle, an inner receptacle, an annular internal flange formed in the upper part of said outer receptacle at a substantial distance below its top, said flange being provided with a plurality of notches, the lower part of said inner receptacle being provided with perforations, the upper part of said inner receptacle being slightly larger than the lower body portion thereof to form a shoulder to rest on the upper edge of said outer receptacle to support the bottom of the inner receptacle a short distance above the bottom of the outer receptacle, vertical external integral ribs on said inner receptacle extending from said shoulder to the perforations in the bottom of said inner receptacle, said ribs fitting in said notches when the inner receptacle is in its lower position in said outer receptacle and adapted to fit closely against the inner sides of the outer receptacle, said inner receptacle being adapted to be elevated until said ribs are withdrawn from said notches and turned until the lower end of said ribs rest on said flange and support the inner receptacle in the upper part of the outer receptacle, and an outwardly extending handle attached to each receptacle near its top.

In testimony whereof we affix our signatures.

LESTER L. GARIBALDI.
FRANCIS M. CARY.